United States Patent [19]

Leivenzon et al.

[11] 4,452,292
[45] Jun. 5, 1984

[54] AUTOMATIC DOOR OPENER

[75] Inventors: Simon Leivenzon; Zvi Leivenzon, both of Caulfield, Australia

[73] Assignee: Firmagroup Australia Pty. Ltd., Victoria, Australia

[21] Appl. No.: 490,988

[22] Filed: May 10, 1983

Related U.S. Application Data

[62] Division of Ser. No. 279,362, Jul. 1, 1981, abandoned.

[30] Foreign Application Priority Data

Mar. 27, 1981 [AU] Australia .............................. PE8188

[51] Int. Cl.³ ............................................. E06B 9/204
[52] U.S. Cl. ...................................... 160/133; 49/28; 361/32
[58] Field of Search .................. 160/133; 49/26–28, 49/199, 357; 337/85, 89, 92; 361/31, 32, 74, 75, 105, 172

[56] References Cited

U.S. PATENT DOCUMENTS

| | | |
|---|---|---|
| 2,881,379 | 4/1959 | Russell . |
| 3,255,397 | 6/1966 | Vaughan ............................. 361/32 X |
| 3,481,387 | 12/1969 | Purdy ................................. 49/28 X |
| 3,733,532 | 5/1973 | Hill . |
| 3,891,909 | 6/1975 | Newson . |
| 4,161,681 | 7/1979 | Rathje ................................ 361/31 X |
| 4,189,712 | 2/1980 | Lemelson ......................... 361/172 X |
| 4,272,708 | 6/1981 | Carle et al. . |

FOREIGN PATENT DOCUMENTS 495813 of 0000 Australia .
519424 of 0000 Australia .
1395749 of 0000 United Kingdom .

OTHER PUBLICATIONS

"Genie Automatic Garage Door Opener System by Alliance, Owner's Manual GS 850", The Alliance Manufacturing Co., Inc., (copyright 1980).

Primary Examiner—Peter M. Caun
Attorney, Agent, or Firm—Biebel, French & Nauman

[57] ABSTRACT

A door is provided having an automatic opening means for the door and a key locking facility for mechanically locking the door in a door closed position and electric circuit means connected with the motor means to sense a change in the electrical operating conditions of the motor above that which is normal for operation of the motor and to remove the above normal power thereby supplied to the motor in such circumstances.

The sensing means preferably comprises a means which switches off the power once the electrical operating conditions are sensed above that which is normal and whereby it returns the power some time later and should the motor then reexperience electrical operating conditions above that which is normal the sensing means will again switch off the power to the motor.

The sensing means desirably comprise a bimetallic cut out switch means.

6 Claims, 20 Drawing Figures

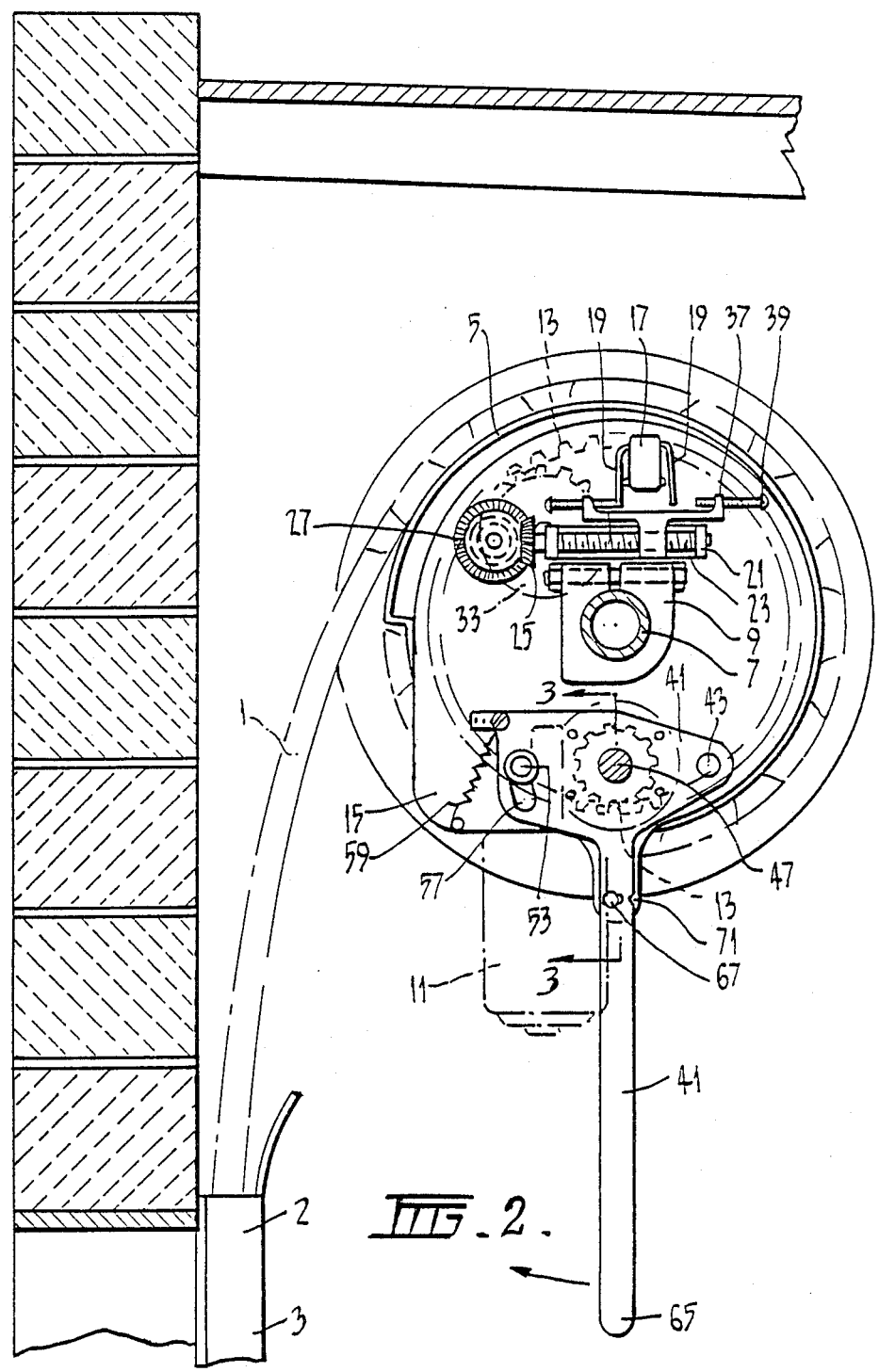

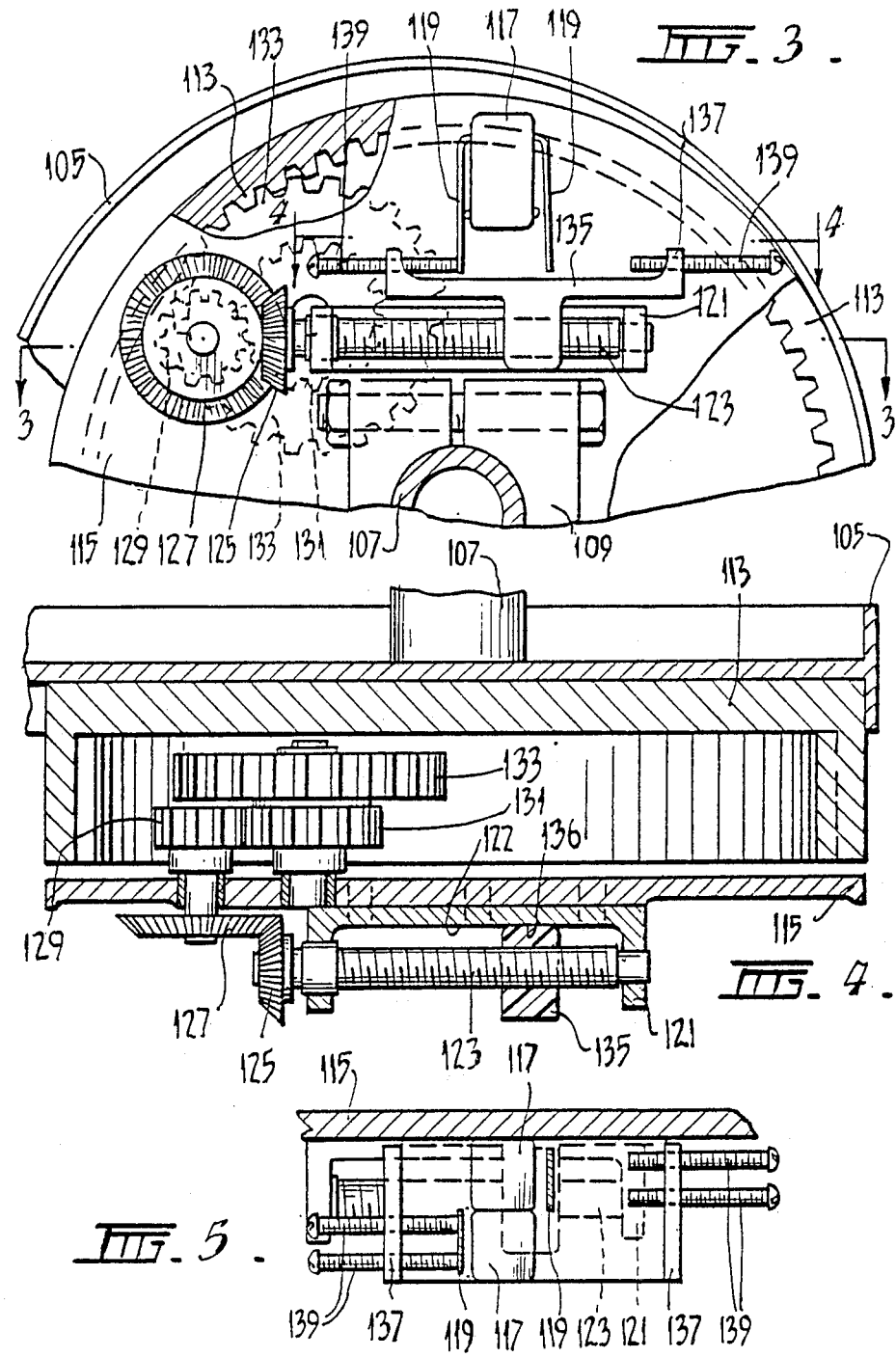

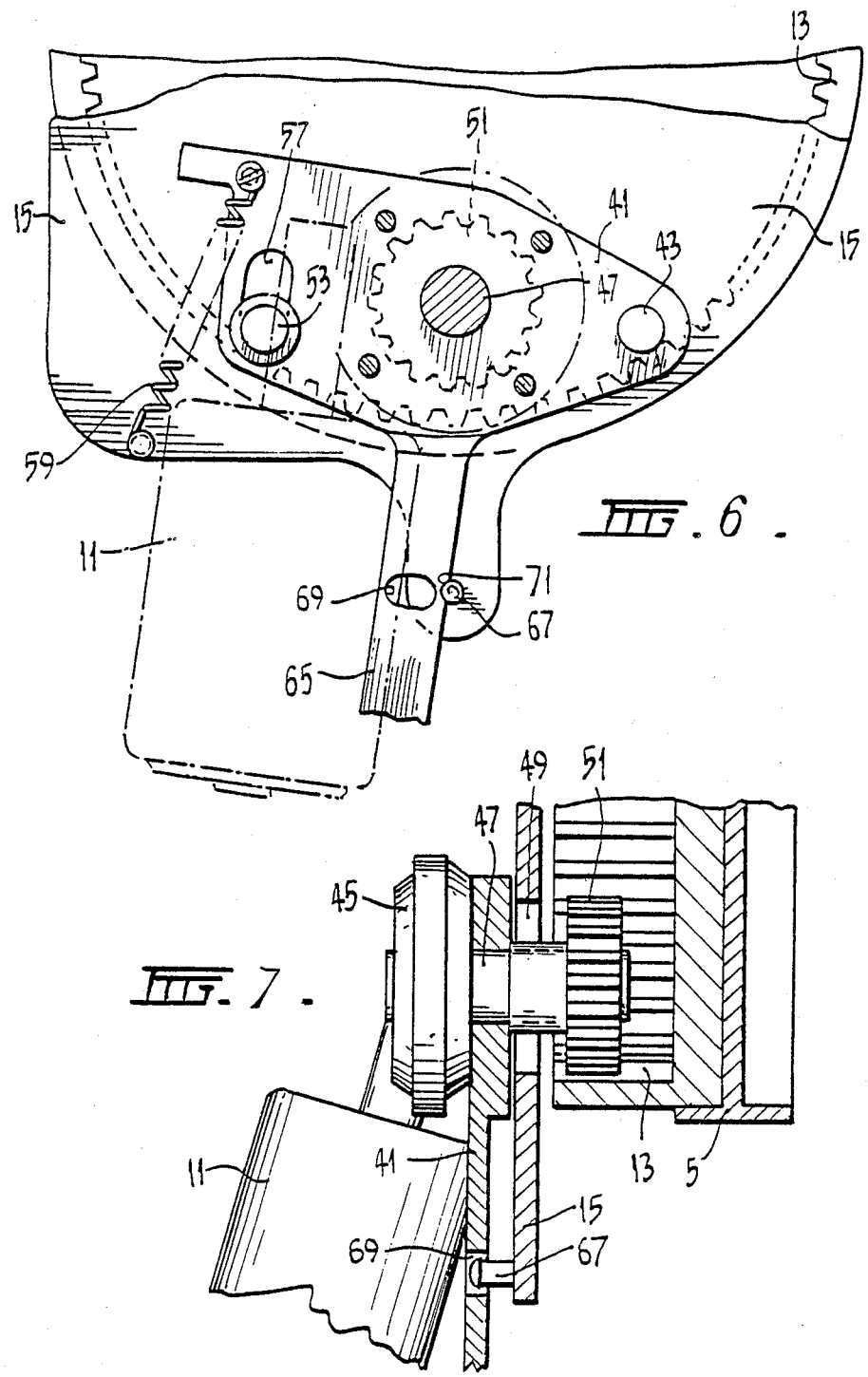

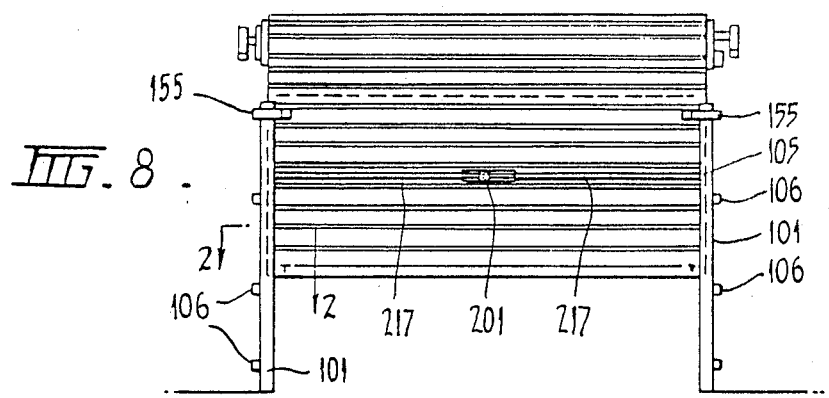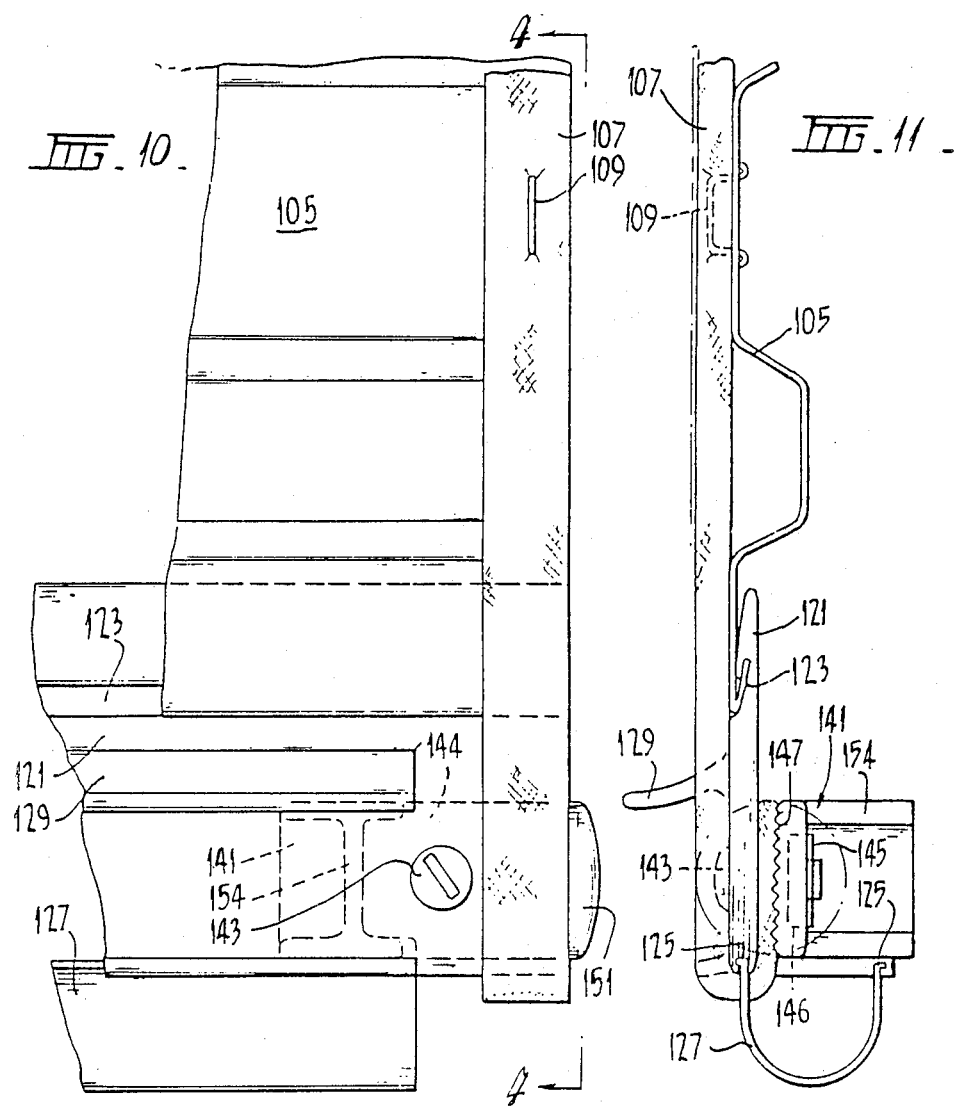

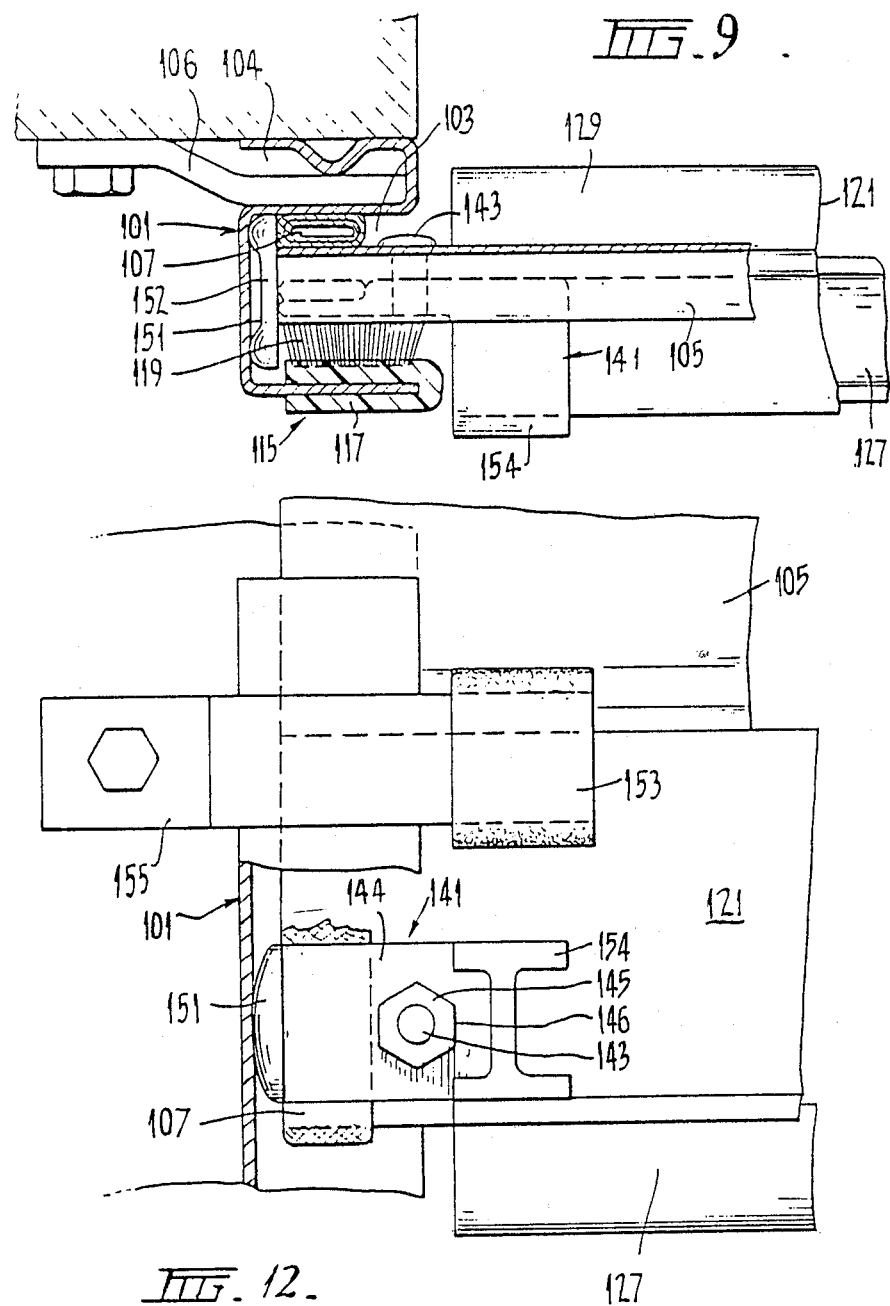

AUTOMATIC DOOR OPENER

This is a division of Ser. No. 279,362 filed July 1, 1981. Now abandoned.

BACKGROUND OF THE INVENTION

1. Field of the Invention

This invention relates to an automatic door opener and relates particularly but not exclusively to such for use on garage doors of the roller shutter type or the tilt type.

2. Statement of the Prior Art

When automatic door openers are provided on doors such as garage doors it has been undesirable to provide a key locking system for the door wherein the door is mechanically locked on operation of the key. This feature has even been more undesirable when the automatic door opener is a radio controlled automatic door opener. The reason for the undesirable provision of a key locking means is that once the door is key locked the automatic door opener can be accidentally or unwantingly placed in operation to open the door. If this occurs then the electric motor means used to open the door is locked and thus the motor draws a stalling current. This current is sufficient to burn out the motor and as a consequence initiate a fire. The present invention has been devised to provide a means whereby the door and automatic door opening system can be key locked closed and wherein if the automatic door opener is accidentally or unwantingly operated then there will be no damage to the motor means.

STATEMENT OF THE INVENTION

Therefore in accordance with the present invention there is provided the combination of a door, an automatic opening means for the door and a key locking facility for mechanically locking the door in a door closed position and electric circuit means connected with the motor means to sense a change in the electrical operating conditions of the motor above that which is normal for operation of the motor and to remove the above normal power thereby supplied to the motor in such circumstances.

Most preferably the sensing means comprises a means which switches off the power once the electrical operating conditions are sensed above that which is normal and whereby it returns the power some time later and should the motor then re-experience electrical operating conditions above that which is normal the sensing means will again switch off the power to the motor. Thus the sensing means will operate cyclically to prevent a burn out of the motor means but still allow the circuit to be operatively connected with the motor means such that when the key locking means is released the automatic door opening circuitry can be automatically placed in a condition where the door can be opened.

It is particularly preferred that the sensing means comprise a bimetallic cut out means.

Most preferably the electrical change sensed is a change in the current flowing to the electrical drive means.

BRIEF DESCRIPTION OF DRAWINGS

In order that the present invention can be more clearly ascertained a preferred construction will now be described with reference to the accompanying drawings wherein

FIG. 2 is an end view of a drum on which a roller door curtain is wound, showing both limit stop means and curtain reversing means for detecting when an object is under the door, and for returning the curtain to an open position.

FIG. 3 is a close up end view of the limit stop means shown in FIG. 2.

FIG. 4 is a plan sectional view taken along line 3—3 of FIG. 3.

FIG. 5 is a detailed sectional plan view taken along line 4—4 of FIG. 3.

FIG. 6 is a close up end view of the reversing sensor means for detecting an object underneath the door curtain.

FIG. 7 is a detailed sectional view showing the drive train from the motor to the drum.

FIG. 8 is a rear view of the curtain, door frame all fitted in a door opening.

FIG. 9 is a plan section view taken in the direction of arrows 2—2 shown in FIG. 8.

FIG. 10 is a front view, on an enlarged scale, of a side of the curtain.

FIG. 11 is a side view taken in the direction of arrows 4—4 shown in FIG. 10.

FIG. 12 is a rear view of the door, on an enlarged scale, at one edge, when the door is in the raised position.

DETAILED DESCRIPTION OF PREFERRED EMBODIMENTS

Figure 1:
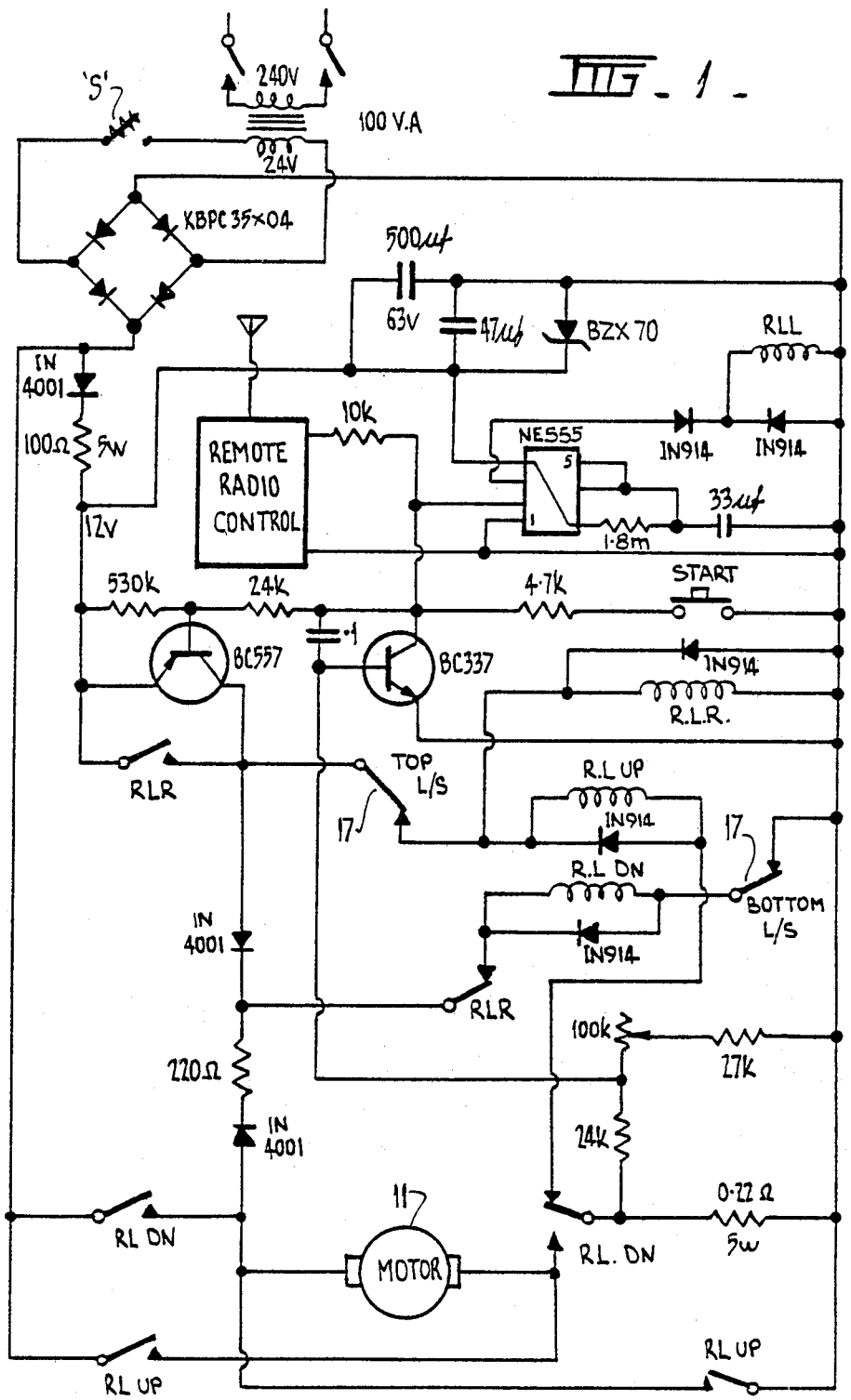
FIG. 1 is an electrical circuit diagram of one preferred circuit for use with a roller shutter door.
Figure 13:
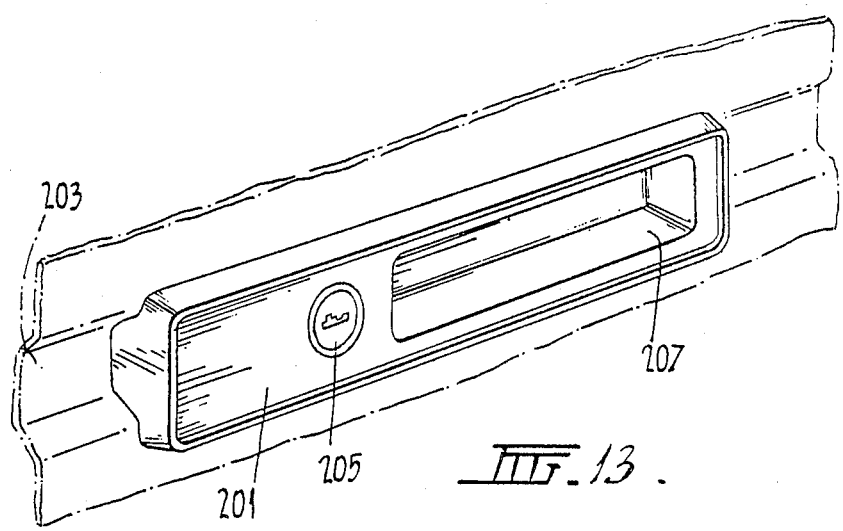
FIG. 13 is a front perspective view of the door curtain and a lifting handle and a lock.
Figure 14:
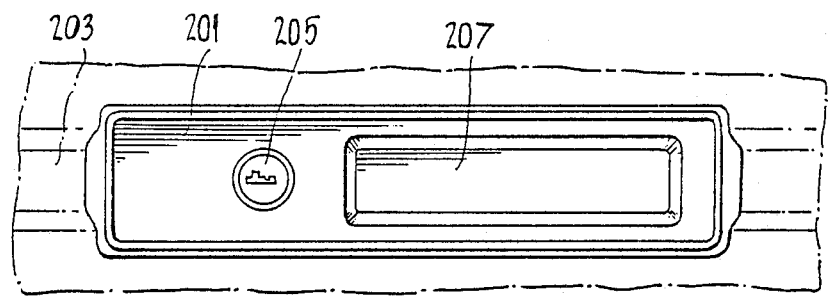
FIG. 14 is a front view of the components shown in FIG. 13.
Figure 15:
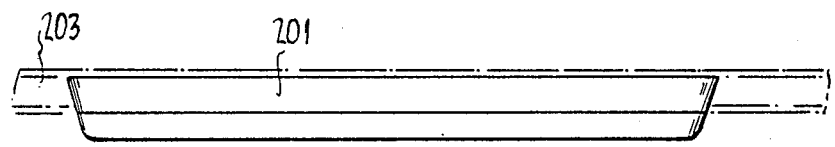
FIG. 15 is a top plan view of the components shown in FIG. 14.
Figure 16:
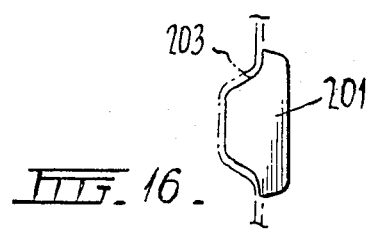
FIG. 16 is an end view of the components shown in FIG. 13.
Figure 17:
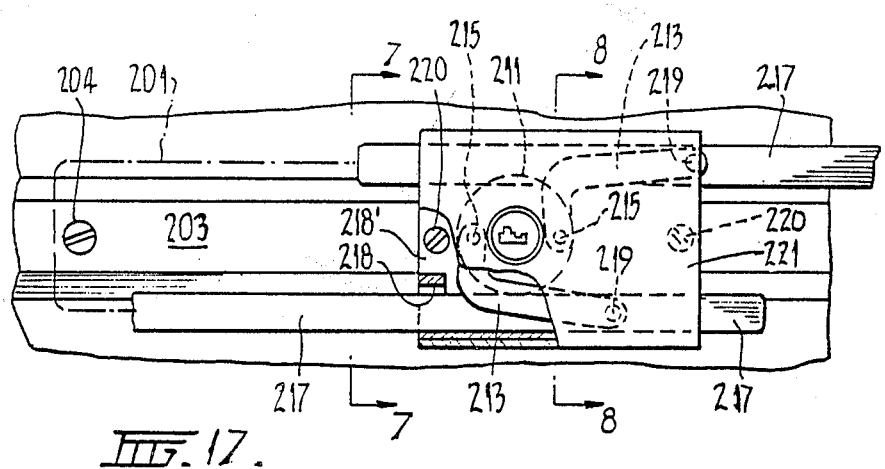
FIG. 17 is a rear view of the components showing locking bars in a door locked position.
Figure 18:
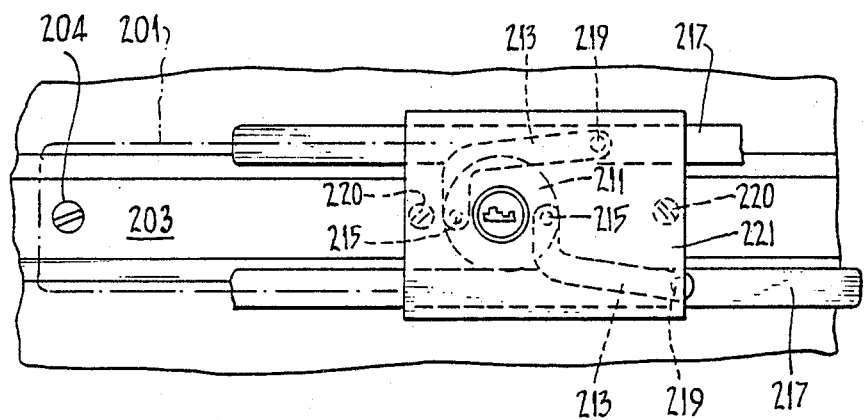
FIG. 18 is a rear view similar to FIG. 17 but showing the locking bars in the door unlocked position.
Figures 19, 20:
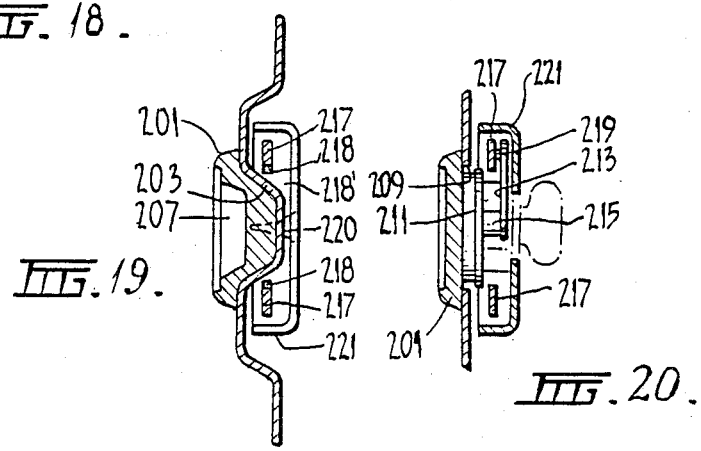
FIG. 19 is an end view along line 7—7 of FIG. 17.
FIG. 20 is an end sectional view along line 8—8 of FIG. 17.

In FIG. 1 there is shown an electrical motor 11 which is drive connected with a mechanism (FIGS. 2→7) to open and close a garage door. The mechanism may conveniently comprise a gear train which drives a drum onto which the curtain of the door is wound. Alternatively, if the door is a tilt lift door then the mechanism may conveniently comprise a gear train which is arranged to extend or retract a lever which, in turn, is fitted to the door and opens the door when retracted and closes the door when extended. The motor 11 may be of any suitable type having either rotor windings and field windings which can be connected in any known manner such as for a compound motor, a series motor and the like, or it can be a motor with a permanent magnet stator and rotor windings as shown in the preferred embodiment. The motor 11 is, in turn, supplied from a D.C. voltage source of 24 V.D.C. obtained from a mains A.C. supply after being suitably transformed and then rectified.

In the circuit there is shown a series of relays, starting at the top, R.L.L., R.L.R., R.L.U.P., R.L.D.N. Relay RLL is a relay used for switching on a light not shown in the circuit diagram, for approximately a two minute period when the door is opened. This is used for illuminating the area behind the door such as a garage or the like. The light may be a 24 V lamp which is connected across the 24 V line when relay RLL closes or alternatively may be a mains operated lamp which operates when relay RLL closes.

R.L.R. is a reversing relay which reverses the drive to the motor if there is an object under the door when it is being closed.

R.L. UP is the relay used to open the door from the closed position.

R.L. DN is the relay used to close the door from the open position.

A start button START is shown in the circuit and is used for manually operating the electronic circuit to cause the door to be raised and lowered. A series connection of resistors 24K and 27K, a variable potentiometer 100K are connected in parallel with a 0.22 ohm 5 watt resistor and all are arranged such that a portion of the current fed to the motor during the door closing sequence can appear across the base emitter terminals of transistor BC337 to sense any change in the motor operating current, such as an increase. This causes the motor to reverse its direction of rotation when it is moving to close the door if an object is under the door. Thus an increase of current is delivered to the motor when the door strikes the object. This is sensed and the door re-opened. A remote radio control unit of known construction is provided which when operated gives output signals which simulate any signals delivered by the 'start' button switch.

Upper and lower stops are provided in the door mechanism for the door's ravel which represent the fully open and fully closed positions. Limit switches Top L/S and Bottom L/S are positioned to be respectively activated when the door reaches the open and the closed positions.

The operation of the circuit will now be described. If the door is closed and the start button is operated or alternatively the remote control unit is operated, then R.L.U.P. and R.L.L. close and cause the door to drive up until the top limit switch Top L/S opens. R.L.L. activates the lamp for the period determined by the timer NE 555. The time is set by the 1.8 m resistance and the 33 μf capacitor. When the door is open and the start button is pressed, or alternatively the remote control unit is operated and signals a change required, then R.L.D.N. closes and causes the door to drive down until the bottom lixit switch opens. If prior to the bottom switch being reached, the start is pressed or alternatively the remote control is operated, then R.L.R. will close causing R.L.D.N. to drop out and R.L.U.P. to close. These actions reverse the direction of rotation of the motor and change the direction of movement of the door. The door will then subsequently switch off when it reaches the top limit switch.

If the door is moving to the closed position and is stopped by an obstruction then the overload current to the motor as sensed by resistors 27K, 100K, 24K and 0.22 ohms and provide a voltage across the transistor BC337 to cause it to switch "on" and then transistor BC557 to switch "on" resulting in RLR closing and the motor operating in the reverse direction to open the door. Desirably the top limit switch is adjusted to provide an over travel so that it will not close when the door is moving from the door open to the closed position until a minimum of 1 second after the start of closing the door. This is to provide an interlock in the necessary circuitry. If power should fail during operation of the door then the door will cease movement. On resumption of power to the apparatus and on reclosing the start button or resignalling the radio transmitter of the remote control unit then the door will move up until it opens the top limit switch.

The potentiometer 100k is used to adjust the value of voltage across the series connection of resistances 24k, 100k, and 27k so that the transistor BC 337 can be adjusted to switch when there is an increase in current to the motor above a selected amount caused by the door striking an object when it is being moved to the closed position.

A code combination feature can be incorporated in the remote control device so that the door can be operated only when a selected code is signalled.

A bimetallic switch means 'S' is shown in the circuit between the main transformer and the rectifier circuit. The bimetallic switch is sold under the trade mark "MICROTHERM" by Microguard Controls, 82 Virginia St., Springvale, Victoria, Australia. An appropriate current rating type is used such as Model No. T 11-125-2-6%. In use should the door curtain be key locked closed and the motor activated to raise the curtain, then clearly the motor will be unable to rotate and thus it will draw a stalling current. This excessive current is sufficient to cause the bimetallic switch 'S' to operate to disconnect the power to the circuitry. Thus the stalling current to the motor will be removed preventing burn-out of the motor. The bimetallic switch 'S', on opening, will reclose after a certain time and if the door is still key locked closed, then it will cycle from the circuit open to the circuit closed positions, but preventing a burn-out of the motor. The bimetallic switch 'S' also provides an isolating means to the electric circuit should it develop a short circuit and provides a further security means for the door opener.

Referring now to FIG. 2 there is shown a preferred roller door curtain 1 which slides in a guide 2 which forms part of a door frame attached to the front wall of a building around an opening in which the door 1 is situated. The curtain 1 is wound around a drum 5 and the drum 5 has an axle 7 which is suitably supported at both ends of the drum 5 to the door frame 3 or to the wall of the building by brackets 9. The exact means of supporting the brackets 9 relative to the frame 3 has not been shown in order to aid clarity of the drawing, however, it comprises an extension which is arranged to be clamped, by bolts, to the frame 3 or the wall. A D.C. electric motor 11 is arranged to drive an internal ring gear 13 within the drum 5 so as to wind or unwind the curtain 1 onto the drum 5. An end plate 15 is carried by the bracket 9 at one end of the drum 5 and supports the necessary sensing means to be described hereinafter. The end plate 15 remains stationary relative to the drum 5 during rotation of the drum 5.

The sensing means for sensing the fully closed and fully opened positions of the curtain 1 of the door will now be described in detail. Two limit switches 17—shown one behind the other in FIGS. 2 and 3—are fastened to the end plate 15 in the position shown. The limit switches 17 each have arms 19 which depend downwardly and operate respective contacts within the switches 17. Each limit switch 17 is connected with electronic circuitry in FIG. 1 so as to stop rotation of the motor 11 by disconnecting the D.C. Voltage supplied thereto. A U shaped bracked 21 is fastened to the end plate 15 in the position shown and has a worm thread 23 suitably journalled therein. The worm thread 23 is journalled for rotation about its longitudinal axis relative to the U shaped bracket 21. Mounted on the end of the worm thread 23 is a bevel pinion gear 25 which meshes with a bevel crown gear 27 which is journalled on a shaft which protrudes through the end plate 15 and carries a spur gear 29 thereon. Spur gear 29 meshingly engages with a further spur gear 31 journalled in the end plate 15 for rotation about its central axis. Attached to the rear of spur gear 31 is a further spur gear 33 which meshes with the teeth on the ring gear 13. In use, when the drum 5 rotates, ring gear 13 rotates therewith and drives the gear through the gear train 33, 31, 29, 27 and 25, to in turn, rotate the worm thread 23. Worm thread 23 carries a carriage member 35 which advances or retreats along the worm thread 23 relative to the pinion 25. The carriage member 35 has upstanding ends 37 which carries screw thread adjusting members 39. The screw thread adjusting members 39 are provided so that they can be adjusted to provide the required spacing between the open and closed positions respectively of the carriage member 35 along the worm gear 23. Thus, when the door is in the closed position one pair of the adjusting means 39 operates one of the arms 19 of the switch 17 and when the door is in the other position the other adjusting means 39 operates the other arm 19 of the other switch 17. The carriage member is prevented from rotating with the worm thread 23 by the rear face 36 slidingly engaging with the inside face 22 of the U shaped bracket 21.

With the device illustrated it is possible to accurately adjust the door for closing precisely to the fully closed and fully opened positions and to stop the motor 11 at those positions. Lock-nuts, not shown are screw threaded on to the adjusting means 39 to lock them in the set positions.

The motor 11 is mounted on a swingable arm member 41 which is mounted to the end plate 15 so as to swing about pivot 43. The motor 11 is of known configuration which has an angle drive head 45. The output shaft 47 of the motor 11 passes through the end plate 15 through an elongate slot 49 (see FIG. 6). The shaft 47 has a pinion gear 51 mounted thereon and is arranged for meshing engagement with the ring gear 13. The plate 41 has a guide pin 53 fastened to the end plate 15 and spaced from the pivot 43. The guide pin 53 has a head thereon which retains the plate 41 captive relative to the end plate 15 but so that it can swing parallel thereto about pivot 43. The guide pin 53 locates within an elongate slot 57 and a spring 59 connected between an end of the arm member 41 and the end plate 15 applies a bias to urge the gear 51 into meshing engagement with the ring gear 13. This is shown in FIG. 2. The spring 59 maintains and holds the gear 51 in mesh with the ring gear 13.

In order that the curtain 1 can be opened manually, rather than by the motor 11, then it is necessary to disengage drive from the gear 51 to the ring gear 13. This is achieved by moving an arm member 65 which is an extension of the arm member 41 outwardly relative to the plate 15 so that a pin 67 does not locate within a slot 69 in the arm member 65, thus cranking the gear 51 out of drive engagement with the ring gear 13. In order to locate the gear 51 in the non drive position the pin 67 can locate behind the arm 65 in a notch therein. The notch is shown in FIG. 2 by numeral 71.

It will be appreciated that the switch means 19 could be mounted on the carriage member 35 and that a post or stops with adjustable limits be provided on the end plate 15, so that the switch is movable instead of the stop means. Such an alternative construction is within the scope of the present invention.

The frame 101 of the door is of rolled metal section of generally 'S' shaped channel as shown in FIGS. 8-20. The frame 1 has an opening 103 which receives a portion of the sides of the roller door curtain 105. The frame 101 also has an opening 104 which receives lugs 106 which are in turn used to clamp the frame 101 around the door opening by being bolted to the material around the opening. The curtain 105 has a plurality of corrugations rolled formed therein; the corrugations being substantially parallel with the axis of rolling of the curtain 105. The corrugations form crests and troughs in the curtain. On one face of the curtain at each side edge there is a wearing strip 107 attached thereto. The wearing strip 107 is attached by riveting or stapling to the crests on one face by rivets or staples 109. The wearing strip 107 extends throughout the length (height) of the curtain and prevents stretching of the curtain as by the corrugations flattening. The wearing strips 107 have a resilient inner plastics material core and a nylon woven cord outer covering thereon.

A resilient friction surface 115 in the form of a strip and known as "woven poly pipe weather seal" and manufactured by Schlegel Pty. Ltd. of 565 Harris St., Ultimo Broadway, N.S.W., Australia, is provided and fastened to the frame 101 so as to provide a resilient friction surface for engaging the opposite face of the curtain 105. The strip 115 has a plastics material portion 117 of generally U shape cross section with a plurality of bristles 119 embedded on one outer face thereof. The strips 115 are a press fit over an edge of the frame 101 (see FIG. 9) and are fixed thereto as by gluing. The strips 115 extend the height of the door frame 101. The other side edge of the curtain and frame is identical.

In use, when the curtain 105 is to roll up or down, the wearing strip 107 prevents the curtain from stretching, as would happen if tension were applied to the top and bottom of the curtain causing the corrugations to flatten and it also provides a resilient means for engaging with the inside of the door frame 101 whereby to allow for smooth sliding engagement therewith and a resilient means to allow for slight compression so as to ride over surface undulations which may be on the inside of the frame 101. The strip means 115 with its bristles provides a resilient means which applies a light pressure against the face of the curtain 105 by flexing of the bristles and urging the wearing strip 107 against the inside of the frame 101. Such pressure provides controlled resistance to the movement of the curtain 105 in the frame. The resistance is maintained substantially constant even if the thickness of the curtain should change marginally as by wearing of the strips 107 during use. It will be appreciated that the bristles of the strips 115 are resilient and flexible and that the dimensions of the channel are chosen so that the bristles slightly bend and apply a small resilient force to the curtain 105 as a result of their resiliency. Because the bristles are always in a bent condition when they engage the curtain 105 a controlled friction resistance is applied to the curtain 105 even if the thickness of the curtain should change marginally. Also the strips 115 are such that the curtain is prevented from lateral movement back and forth within the frame 101, thereby inhibiting the curtain 105 from rattling in its frame 101 in heavy winds.

The bottom of the curtain 105 has an aluminum extrusion foot 121 fitted thereto. The foot 121 has an upwardly inclined slot 123 therein (see FIG. 11) in which the bottom edge portion of the curtain 105 is received. The foot 121 has two spaced apart grooves 125 at the bottom thereof in which a resilient material weather seal 127 for the curtain 105 is received. The weather seal is to butt against the floor under the curtain 105 when the curtain 105 is in the closed position. The weather seal 127 is made of flexible plastics material so that it will closely follow surface undulations in the floor.

As shown in FIG. 11 the foot 121 has a handle portion 129 extending therefrom and the handle portion 129 is removed at the extreme side edges of the curtain 105 where the curtain 105 is received in the frame 101.

The tail of the wearing strip 107 extends downwardly past the foot 121 and returns on the rear face of the curtain 105. (see FIG. 10). The tail of the wearing strip 127 is clamped to the foot 121 by a blockmember 141 which in turn is held to the foot 121 by a screw 143 and nut 145.

The block member 141 is made of Nylon and has a generally planar main body part 144, the rear surface of which has a recess 146 therein for receiving the nut 143. The inside face of the main body part has a plurality of transversely extending saw tooth corrugations 147 therein. The depth of the recess 145 and the dimensions of the corrugations are such that the wearing strip 107 will be rigidly clamped to the foot 121 when the block member 144 is in turn clamped to the foot 121. The block member 141 is fastened to the foot 121 it will project past the side edge of the curtain 105 (see FIG. 10 and FIG. 12) and lightly engage with the inside face of the opening 103 of the frame 101. This prevents transverse side to side movement of the curtain 105 within the frame 101. The domed stud 151 has a scolloped out portion 152 (see FIG. 9) which extends from top to bottom of the stud 151. The scolloped out portion 152 minimises the area of contact of the stud 151 with the inside face of the opening 103 compared to that of a flat headed stud or of a domed stud with a large radius. Thus the sliding friction to movement of the curtain is maintained low. The block member 141 has an "I" shaped extension 151 extending outwardly from the main body 144. The extension 151 is arranged to extend to be close to the frame 101 (see FIG. 9) and is provided to abutt with a stop means 153 fastened near the top of the frame 101 to prevent the curtain 105 from rolling out of the frame 101 when it is rolled up. The stop means 153 comprises a rubber buffer fitted onto a lug member 155 which is fastened to the material around the door opening in the position as shown or alternatively is fastened directly to the frame at the required position.

The door 105 has a handle portion 201 mounted to closely fit in the front face of the door in a transverse corrugation 203 therein so as not to protrude unduly therefrom. The corrugation 203 is of known configuration for roller shutter doors. The handle portion 201 is held to the door by screws 204 (see FIGS. 17 and 18). The handle portion 201 contains a lock 205 and a recessed handle 207 for the door extends rearwardly thereinto. The lock 205 is of known form and protrudes through the back face of the door through an opening 209 therein (see FIG. 20). The rear end of the lock 205 has a disc 211 integrally attached thereto so that when the lock barrel is rotated the disc 211 rotates therewith. Attached to the disc 211 are two arms 213. The arms 213 connect with the disc 211 by lugs 215 which extend from the disc 211, and these arms 213 are, in turn, fastened to locking bars 217 by similar lugs 219 on the locking bar 217. It will be noted from viewing FIGS. 17 and 18 that when the barrel of the lock 205 is rotated the bars 217 are either extended or retracted from the respective sides of the door, the upper bar 217 extending outwardly of the door to the right and the lower bar 217 outwardly to the left. To lock the door the barrel of the lock 205 is rotated so that the bars 217 are moved to the position shown in FIG. 27 so that the bars 217 can locate in suitable openings in the door frame.

The bars 217 are guided in the corrugations 203 in the rear face of the door by openings 218 in each end of a plate member 218' which is secured to the door by screws 220 which pass into the housing 201.

The cover plate 221 covers the arms 213 so that they are not visible from the rear of the door.

The lock 205 has a key opening from the rear face into which a key for the lock can be inserted to open the door from the rear is desired.

It will be noted that the preferred assembly provides for a relatively thin handle lock and latch bar mechanism so that when the corrugated door is rolled up the thickness thereof does not unduly cause problems.

Thus it will be appreciated that in the door construction described herein that should the door be locked closed by operation of the key and the door signalled to be opened by the remote radio control unit then the bimetallic switch means 'S' will sense a current flowing to the motor which is above the normal operating current supplied to the motor and switch off power to the motor. Thus the motor will be prevented from burning out. When the bimetallic switch means 'S' cools down it will reconnect the electronic circuitry and signal the motor to attempt to open the door once more. If the key locking means is still operative to lock the door then the bimetallic switch means 'S' will cycle on and off maintaining the electric circuitry in a condition whereby when the key locking means is released the door can then be automatically opened without any manual resetting. It should also be noted that because the bimetallic switch means 'S' cycles in and out of circuit the motor means is prevented from burning out during this procedure.

Modifications may be made to the invention as would be apparent to persons skilled in the door opening arts.

We claim:

1. In a combination of a roller curtain door having a door curtain which is wound on and off a roller door drum to open and close the door respectively, an automatic opener for the door, and a locking facility for mechanically locking the door in a closed position in which the automatic opener includes a reversible electric drive motor having a pinion gear drivably connected therewith and arranged to mesh with a ring gear connected to said door drum to drive said door drum to wind the door curtain on and off said door drum, and an electric control circuit connected to operate the electric motor from a source of electric power, and in which said circuit controls the operation of said electric drive motor, the improvement comprising:

sensing means connected in series with said electric circuit to sense a change in the electrical current drawn by said circuit above that which is normal for operation of said circuit and motor and to disconnect said circuit in such circumstances, said sensing means further comprising a switching means connected to switch off power from said source to said circuit once the current flowing through said switching means to said circuit is sensed above that which is normal and to automtically restablish the power after a time interval, and further operable in the event said circuit re-experiences electrical current above that which is normal to again switch off the power and to continue to cycle in such on/off mode until the electrical current demand condition returns to normal, said reversible electric motor mounted on an arm which is mounted for swinging movement about an axle, the central longitudinal axis of said axle being substantially parallel with a central longitudinal axis of said drum and spaced from a central axis of the pinion gear, said swinging movement being such that the reversible electric motor can be drive engaged or disengaged with said ring gear by swinging of said arm about said axle to allow said door curtain to be opened manually in the event of power failure by disengaging said drive.

2. The combination as claimed in claim 1 wherein said disengaging of said drive is effected by releasing a holding means which holds said arm in a position where said pinion is in meshing engagement with said ring gear.

3. The combination as claimed in claim 1 wherein said arm has an integrally attached elongate handle extending therefrom, said handle being swingable to cause said arm to swing about said axle to permit manual disengaging of the drive between the reversible electric motor and the ring gear, and wherein said handle can also swing in a direction generally parallel with the central longitudinal axis of the drum, said handle having an opening therein, fixed holding means for locating in said opening and positioned so that when said handle is swung in a direction generally parallel with the central longitudinal axis of the drum it will cause said holding means to move out of said opening and permit said arm to be swung about said axle and to permit said holding means to locate against a further part of said handle and hold the arm in the disengaged condition.

4. The combination as claimed in claim 1 including limit switch sensing means for switching off power to said motor when the door curtain reaches the fully opened and fully closed positions, said limit switch sensing means comprising a gear train drivably connected with said ring gear and including an elongate screw thread, the longitudinal axis of which extends substantially perpendicular with the central longitudinal axis of said drum and immediately adjacent said ring gear and between the circumferential edge surfaces thereof a carriage, said carriage being threaded on said screw thread and restrained from rotating with said screw thread but being able to be advanced or retreated along said screw thread as said screw thread is rotationally driven by said gear train, said carriage having two end flanges spaced apart in a direction substantially parallel with the longitudinal axis of said screw thread, limit switch means supported between said flanges, and respective screw thread limit stop adjusting means carried by each of said flanges whereby the limit switch means can be activated by said respective screw thread limit stop adjusting means when the door curtain is at the fully closed or fully open positions to switch off said reversible electric motor.

5. The combination as claimed in claim 4 wherein said carriage is restrained from rotating by restraining surfaces comprising a side surface of said carriage, and surfaces of a bridging part of a U-shaped bracket member supported by a non-movable part of the assembly, said U-shaped bracket member having said screw thread journalled therein at the free end of the arms thereof.

6. The combination as claimed in claim 1 including sensing means for sensing a door obstruction and for reversing door direction if an obstruction is detected during closing, said door operator mechanism comprising:

an electric two-position switch means in said control circuit for initiating movement of the door to the open or closed position, one position of said switch being an open circuit position and the other position being a closed circuit position, further circuit means connecting said electric switch to a source of electrical current for supplying the same to said motor, so that when said switch is operated once, current is supplied to said motor to drive the door to its closed position, and when said switch is next operated, current is supplied to said motor to drive the door in the opposite direction, and motor current sensing means connected to said further circuit means adapted when said door is moving to the closed position to sense current, said motor current sensing means including a threshold circuit set to provide an output signal if the motor current excees a preset threshold lever which occurs when an obstruction to door closing is encountered, said output signal serving through said further circuit means to cause the motor to be driven in the opposite direction to the open position.

* * * * *